Mar. 5, 1929. H. PETLEY 1,703,899
METHOD OF ELECTRICALLY WELDING A DRILL
Filed May 28, 1925   4 Sheets-Sheet 1
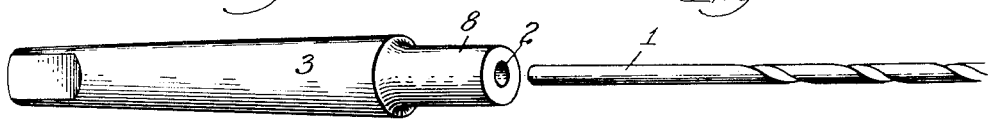
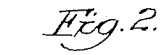
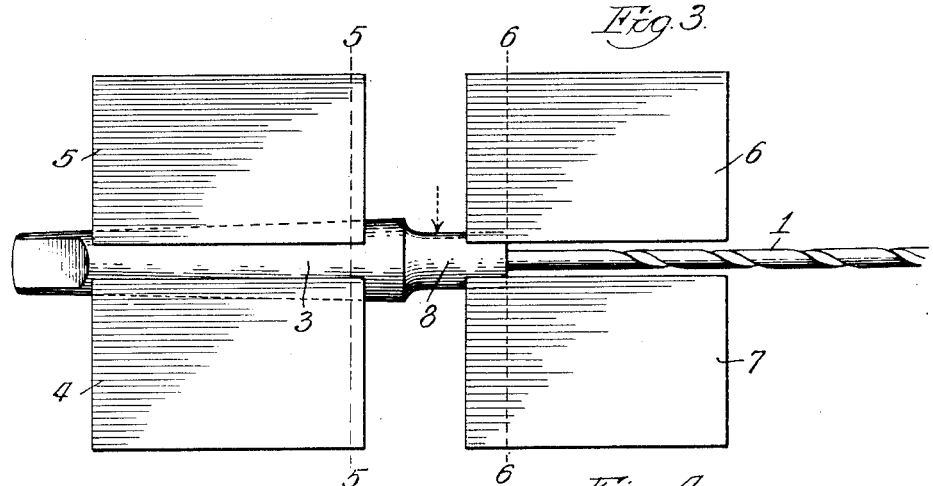
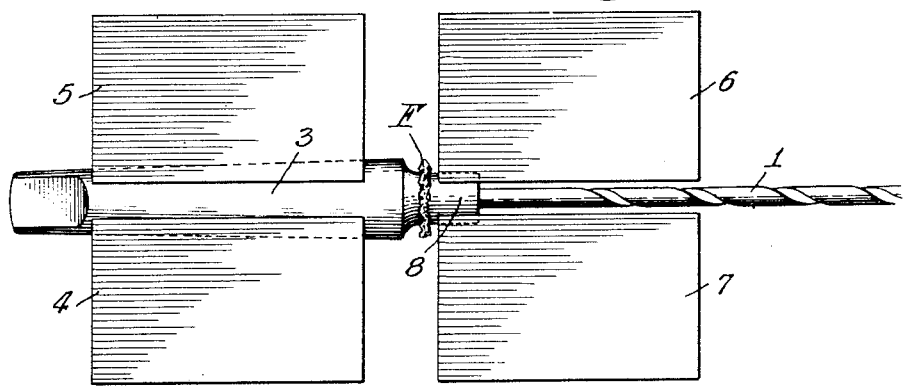
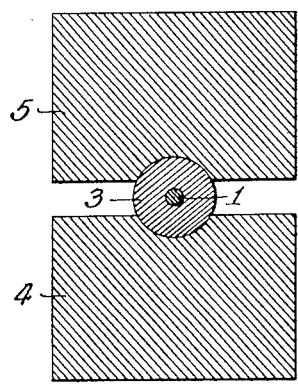
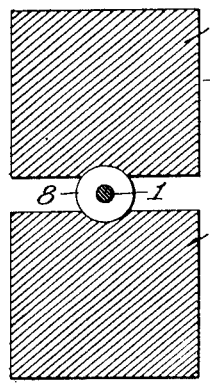
Inventor:
Henry Petley,
by Wallace R. Lane Atty.

Mar. 5, 1929.     H. PETLEY     1,703,899
METHOD OF ELECTRICALLY WELDING A DRILL

Filed May 28, 1925     4 Sheets-Sheet 2

*Inventor:*
*Henry Petley,*
*by Wallace R Lane Atty.*

Mar. 5, 1929.  H. PETLEY  1,703,899

METHOD OF ELECTRICALLY WELDING A DRILL

Filed May 28, 1925   4 Sheets-Sheet 3

Inventor:
Henry Petley,
by Wallace R. Lane, Atty.

Mar. 5, 1929.   H. PETLEY   1,703,899
METHOD OF ELECTRICALLY WELDING A DRILL
Filed May 28, 1925   4 Sheets-Sheet 4
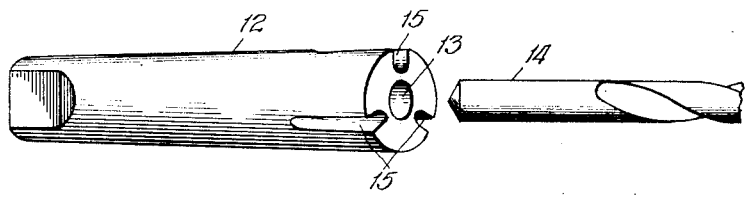
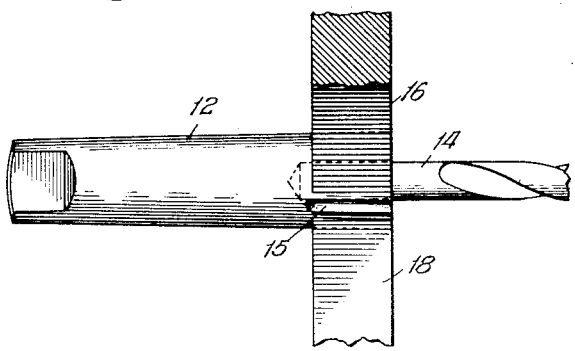
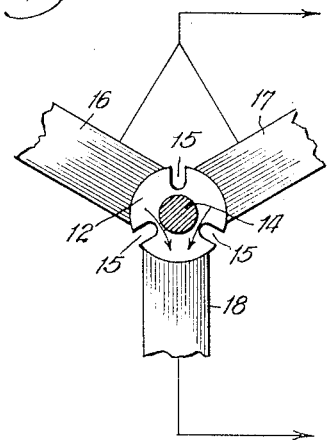
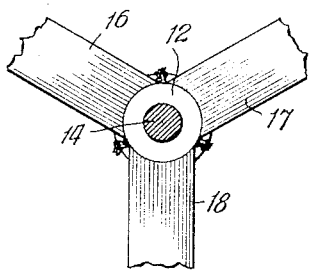
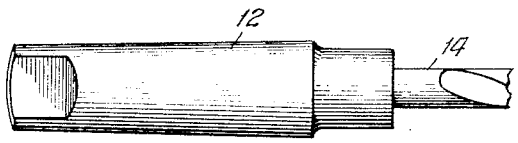
Inventor:
Henry Petley,
by Wallace R. Lane
Atty.

Patented Mar. 5, 1929.

1,703,899

UNITED STATES PATENT OFFICE.

HENRY PETLEY, OF AKRON, OHIO, ASSIGNOR, BY MESNE ASSIGNMENTS, TO WHITMAN BARNES-DETROIT CORPORATION, OF DETROIT, MICHIGAN, A CORPORATION OF MICHIGAN.

METHOD OF ELECTRICALLY WELDING A DRILL.

Application filed May 28, 1925. Serial No. 33,396.

This invention relates to an improved process for welding a high speed tool steel member within the socket of a carbon steel piece. The invention also includes the improved article produced by this process.

The invention, which is of general application will be exemplified by reference to the welding of a drill.

Heretofore in the manufacture of high speed tool steel drills or the like, it has been proposed to insert the high speed tool steel piece into its socket in the shank and then to braze or solder the drill piece into its socket. In certain other instances it has been proposed to heat the socketed shank, and insert in it the piece and thereafter compress the metal of the shank so that it flowed over the surface of the drill and formed an intimate contact therewith throughout. However, these methods have not been successful due to the fact that they did not provide a sufficiently firm and intimate union between the carbon steel shank and the high speed tool steel piece to prevent the piece from either breaking off in the shank or working loose.

One of the objects of my invention is to provide an improved method for effectively welding a high speed tool steel piece within the socket of a carbon or cheap steel piece; among the further objects of my invention are to provide an improved method of welding a high speed tool steel piece within the socket of a carbon steel piece so that the welded union will be formed wholly within the socketed walls of the latter piece; to provide an improved method of welding as hereinbefore stated wherein the union of the metals is localized and the metals are caused to flow in such a manner as to provide an interknitting or interlacing of the metal fibers; to provide an improved method of welding a high speed tool steel barrel to the socket of a carbon steel shank so that the fused metals forming the welded union will adequately resist the stresses incident to heavy duty operations; these and other objects of the invention will be apparent from a perusal of the following specification when taken in connection with the accompanying drawings wherein:—

Figure 1 is a perspective view of the carbon steel shank.

Figure 2 is a perspective view of the high speed tool steel piece or barrel.

Figure 3 is a perspective view of the barrel assembled in the shank and the copper welding dies in welding position.

Figure 4 is a similar view after the flash has been formed.

Figures 5 and 6 are sectional views taken on lines 5—5 and 6—6 of Figures 3 and 4 respectively.

Figure 7:
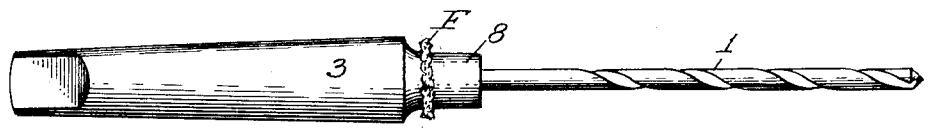

Figure 7 is a perspective view of the welded shank and barrel removed from the copper dies.

Figure 8:
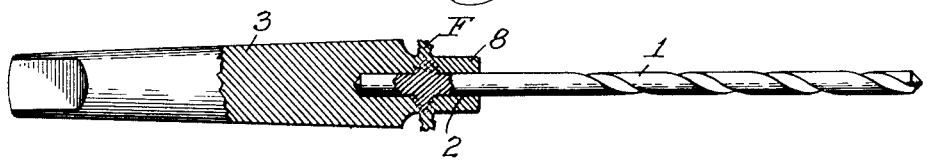

Figure 8 is a partial cross-sectional view therethrough.

Figure 9:
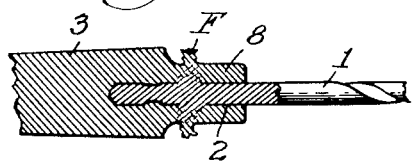
Figure 10:
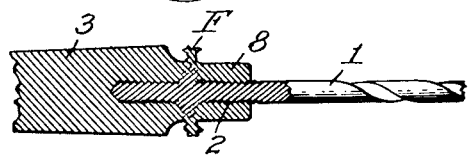

Figures 9 and 10 are cross-sectional views showing the manner in which the fused metal of a high speed tool steel barrel flows laterally in the welding process.

Figure 11:
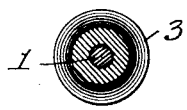
Figure 12:
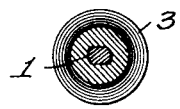
Figure 13:
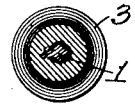

Figures 11, 12 and 13 are cross-sectional views showing the different cross-sectional shapes of the barrels which can be welded.

Figure 14:

Figure 14 is a perspective view of a finished tool.

Figure 15:
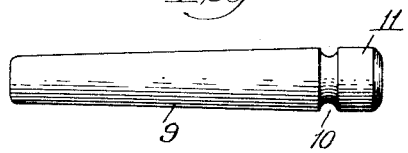

Figure 15 is a perspective view of a preferred form of a shank prior to the welding operation.

Figure 16:

Figure 16 is a perspective view of a corresponding barrel.

Figure 17:
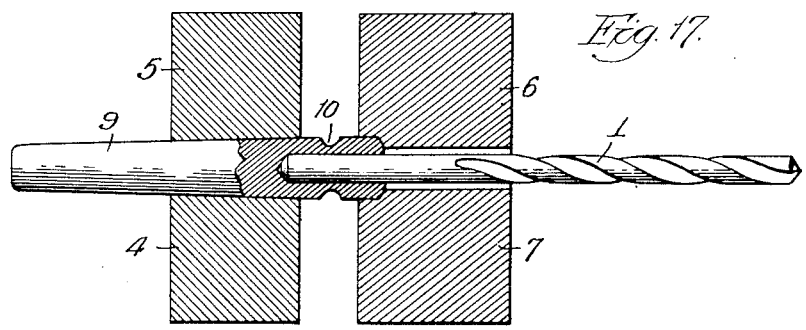

Figure 17 is an assembled view of the shank and barrel and copper welding dies, showing the manner in which the welding assembly is arranged.

Figure 18:
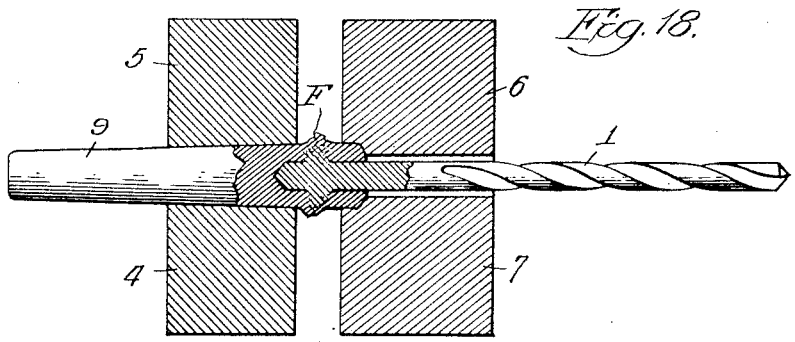

Figure 18 is a corresponding view showing the tool after the welding flash has been made.

Figure 19:

Figure 19 is a perspective view of the finished tool.

Figures 20 and 21 are detailed perspective views of the socket piece and drill member of still another modified manner in which my welding is accomplished.

Figure 22 is a side view partly in section disclosing the manner of welding this type of drill pieces, a portion of the dies being shown in cross-section.

Figure 23 is an end view thereof with a portion of the drill itself in cross-section.

Figure 24 is a corresponding view, after the flash has been formed.

And, Figure 25 is a view of the completely welded drill with the flash removed.

Referring now to the drawings in detail and to the method of welding, the high speed tool steel member or piece 1, which in the present instance is a drill barrel, is inserted in the socket or seat 2 in the end of a carbon steel shank 3. It will be noted that this carbon steel shank 3 is provided with a portion of reduced cross-section surrounding the socket 2. By reference to Figures 8, 9, 10, 17 and 18, it will be noted that the walls of the shank which surround the socket and which are longitudinally extensive therewith form portions of two different cross-sections, that is, a large cross-section and a relatively reduced cross-section. In Figures 8, 9 and 10 this reduced cross-section is in the form of a neck of reduced diameter, while in Figures 15 and 17, and particularly Figure 15, this reduced cross-section is in the shape of a circumferential groove. It is evident that other areas or portions of reduced cross-section are contemplated by this invention, such as shown in Figures 20, 22, and 23.

In carrying out my improved method the copper dies 4 and 5 are clamped in place as shown in Figures 3, 4 and 5. They are placed in contact with the larger diameter of the shank. The complementary copper dies 6 and 7 are arranged to engage the portion 8 having the reduced diameter. These dies 6 and 7 do not engage the high speed tool steel piece 1. This is important. The welding electrical current is then applied and the current will flow across the portion of reduced cross-section approximately at the point designated by the dotted arrow in Figure 3 and the metals both of the high speed tool steel piece 1 and the carbon steel shank 3 will be fused at this localized zone. When these fused metals have become sufficiently molten the copper dies 6 and 7 are moved longitudinally and relatively toward the dies 4 and 5 to form the flash F shown in Figure 4. The application of pressure to this molten, fused metal will cause the metals to flow to form the flash F, the flux of the metals being accompanied by a somewhat simultaneous diffusion or interchange of the ingredients or composition of each part so that the finished weld does not disclose any definite dividing line between the two dissimilar metals and is of a different composition from either of the two elements which are welded together. It is to be noted from an inspection of Figures 8, 9 and 10 that in most instances the metal of the member 1 will be caused to be flowed a considerable distance outwardly and will in a general way follow the line of flow of the raised flash. It is to be noted that the welded union is formed substantially within the body of the shank and within the recess or seat thereof. While the cross-sectional views of the weld as indicated in the drawings appear to disclose definite lines of demarcation between the dissimilar metals, as a matter of fact there is no perceptible dividing line, since the interchange or diffusion of metallic ingredients or composition is so effective that the metal of one part appears to be gradually merged into the metal of the other at the zone of weld.

If desired the welding current may be continued or reapplied after the formation of the weld for a predetermined interval, depending upon the cross-section of the members being welded, whereby to assist in eliminating the usual stresses set up in the metal of the weld during the welding operation. In this manner an interknitting or interlacing of the metallic fibers is effected and there is provided an integral metallic union which will not break or crack under the ordinary drop test or under the ordinary conditions of heavy duty.

It is not necessary that the cross-section of the piece 1 correspond with the cross-section of the recess or bore 2 of the shank. For instance, in Figure 13 the weld is shown with a piece 1 having a square or rectangular cross-section fitting within the round bore of the shank.

In Figures 15 to 19 inclusive, my preferred form is illustrated. In carrying out the method as applied to this form of shank, the latter is provided with a circumferential reduced portion 10 in the form of a groove. The copper dies 4 and 5 will then grip the shank as before, the copper dies 6 and 7 gripping the portion 11 of the shank on the opposite side of the groove 10. It is to be noted that in carrying out this invention the copper dies 6 and 7 do not touch the barrel 1. Welding current is applied as before and the flash is formed in the manner indicated in Figure 18, the flash F being raised at the zone of reduced cross-section so that the groove 10 is completely filled by the raised flash F. The metal flows in a substantially similar manner as it does in the method hereinbefore described.

In certain instances it may be highly desirable to practice the method of my invention as disclosed in constructions shown in Figures 20 to 25 inclusive. In these figures the reduced cross-section of the shank is made up by grooves or notches running laterally instead of in the form of circumferential grooves and the pressure instead of being applied longitudinally as in the other figures, is applied radially, the flash being thrown out between the contacts as before. Referring now to these drawings in detail, Figure 20 discloses the socket piece 12 provided at one end with a bore or socket 13 of sufficient diameter to snugly receive the drill end of high speed tool steel. This latter piece is designated as 14. At spaced intervals circumferentially about the bore 13, the socket piece 12 is provided with one or more grooves or notches 15 which preferably extend longitudinally of the piece 12. Obviously any desired arrangement of notches may be utilized within the spirit of this invention. As shown clearly in Figures 22 and 23, the dies 16, 17 and 18 grip the piece 12 at zones on each side of the notches or grooves 15 so that when pressure is applied by these dies inwardly and the electric current is flowing the molten metal will be flashed outwardly at the zones of these notches just as heretofore illustrated in the other figures, to thereby form the weld. After the weld is formed this welding current may be if desired continued or reapplied for a desired time interval according to the cross-section of the pieces being welded as heretofore described. This continuance or reapplication of the current removes the stresses set up in the metal by the welding process.

In completing the tool the flash is ground or dressed off in any desired manner.

Having thus described my invention, what I claim is:—

1. The method of welding a high speed tool steel member into the socket of a carbon steel member which comprises localizing the flow of a welding current to a portion of the socketed member surrounding the high speed tool steel member to cause the metals of the members to fuse at such localized portion, causing a portion of the fused metals of said members to flow laterally into a flash and to thereby cause an interchange of metallic ingredients at the zone of weld.

2. The method of welding a high speed tool steel member into the socket of a carbon steel member which comprises localizing the flow of a welding current to a reduced portion of the socketed member surrounding the high speed tool steel member to cause the metals of the members to fuse at such localized portion, and causing a portion of the fused metal of each member to flow outwardly to form a flash.

3. The method of welding a high speed tool steel piece to a carbon or cheaper steel piece which comprises forming one of said pieces with a portion of reduced cross section, and forming the same one of said pieces with a socket, inserting the end of the other piece within the socket and passing a welding current through the socketed and inserted pieces so as to cause such current to be localized at the portion of reduced cross section so as to cause the metals of the socketed and inserted pieces to flow, applying pressure to cause the fused metal to flow and effect the weld.

4. The method of welding which comprises providing a socketed carbon steel member, the walls thereof surrounding said socket being provided with a reduced cross-sectional portion, inserting a high speed tool steel piece within said socket, flowing an electrical current at such reduced cross-sectional portion to cause the metals of the socket member at such reduced zone to fuse, applying pressure to cause the fused metals to flow.

5. The method of welding which comprises providing a carbon steel member having a socket, the walls of which member surrounding the socket include a portion of reduced cross-section, inserting a high speed tool steel piece within said socket, applying the welding dies to said carbon steel member only, so that the current passes across the reduced portion to fuse the metals at the reduced cross-section, applying pressure on the set of dies.

6. The method of welding which comprises providing a carbon steel member with a socket and forming a circumferential reduced portion in the wall portion surrounding the socket, inserting a high speed tool steel piece in said socket, flowing electrical current across the reduced portion only to fuse the metals, applying pressure to cause these fused metals to flow.

7. The method of welding which comprises providing a carbon steel member with a socket and with a reduced portion, inserting a high speed tool steel piece in said socket, flowing welding current across the reduced portion only to fuse the metals, applying pressure to cause these fused metals to flow and causing the welding current to flow for a predetermined interval thereafter.

8. The method of welding a high speed tool steel piece to a carbon or cheaper steel piece which comprises forming one of said pieces with a portion of reduced cross section and forming the same one of said pieces with a socket, inserting the end of the other piece within the socket and passing a welding current through the socketed and inserted pieces so as to cause such current to be localized at the portion of reduced cross section whereby to cause the metals to flow, applying pressure to fuse the fluent metals and thereafter continuing the current for a predetermined time.

9. The method of welding a steel piece to a relatively cheaper metallic piece which comprises forming one of the pieces with a socket and forming that portion of the metal surrounding the socket with a reduced portion, inserting the other piece within the socket and causing a welding current to pass through the pieces in a manner to localize the flow of current through the reduced portion whereby to cause the metals thereat to flow, and exerting pressure between the two pieces to raise a flash at the portion or reduced cross section.

10. The method of welding a steel piece to metallic piece of different carbon content which comprises forming one of the pieces with a bore and forming the outer face of the metal forming and surrounding the bore with a portion of reduced cross section, inserting the piece within the bore and passing a welding curent through the two pieces solely at the zone of reduced cross section to cause the metals to flow outwardly and compressing the pieces to raise a flash at the portion of reduced cross section and cause an interflux of the metals of the two pieces.

In witness whereof, I hereunto subscribe my name to this specification.

HENRY PETLEY.